(12) United States Patent
Hanulak et al.

(10) Patent No.: US 10,458,617 B2
(45) Date of Patent: Oct. 29, 2019

(54) LIGHT DEVICE, ESPECIALLY A SIGNAL LAMP FOR MOTOR VEHICLES

(71) Applicant: Varroc Lighting Systems, s.r.o., Senov u Noveho Jicina (CZ)

(72) Inventors: Patrik Hanulak, Cadca (SK); Pavel Sousek, Novy Jicin (CZ); Tomas Policky, Opatovice u Hranic (CZ)

(73) Assignee: Varroc Lighting Systems, S.R.O., Senov u Noveho (CZ)

( * ) Notice: Subject to any disclaimer, the term of this patent is extended or adjusted under 35 U.S.C. 154(b) by 351 days.

(21) Appl. No.: 15/467,138

(22) Filed: Mar. 23, 2017

(65) Prior Publication Data

US 2017/0276314 A1    Sep. 28, 2017

(30) Foreign Application Priority Data

Mar. 23, 2016  (CS) ..................... 2016-176

(51) Int. Cl.
| | |
|---|---|
| *F21S 43/20* | (2018.01) |
| *F21S 43/249* | (2018.01) |
| *F21S 43/19* | (2018.01) |
| *B60Q 1/44* | (2006.01) |

(52) U.S. Cl.
CPC .............. *F21S 43/255* (2018.01); *B60Q 1/44* (2013.01); *F21S 43/19* (2018.01); *F21S 43/249* (2018.01)

(58) Field of Classification Search
None
See application file for complete search history.

(56) References Cited

U.S. PATENT DOCUMENTS

| 6,164,799 A | 12/2000 | Hirmer et al. |
| 2008/0180970 A1 | 7/2008 | Mertens |
| 2009/0213612 A1 | 8/2009 | Flehinghaus |

(Continued)

FOREIGN PATENT DOCUMENTS

| CZ | 20150002 A3 | 2/2016 |
| DE | 2408957 A1 | 9/1975 |
| DE | 19639829 A1 | 4/1998 |

(Continued)

OTHER PUBLICATIONS

Office Action in related German Application No. 10 2017 105 948.2 dated Feb. 1, 2018, with machine English translation (13 pages).

(Continued)

*Primary Examiner* — Britt D Hanley
(74) *Attorney, Agent, or Firm* — Hovey Williams LLP

(57) ABSTRACT

A light device, especially a signal lamp for motor vehicles, comprising a carrier bushing (1) with a translucent cover (2) and an inner chamber (3), wherein a lighting unit (4) is mounted providing the light signaling function, and one light source (91), and a filter (6) with at least one first input surface (83) for entry of at least part of light rays (100) generated by the light sources, and with at least one first output surface (82) designed to emit first light beam (102). The filter includes first segment (8) with the first output surface and second segment (7) with at least one second input surface (73) for entry of at least part of light rays generated by the light sources, and with at least one second output surface (72). The shape of the second output surfaces creates a designer element as a light emitting pattern emitted from those surfaces.

18 Claims, 13 Drawing Sheets

(56) References Cited

U.S. PATENT DOCUMENTS

Figure 1:
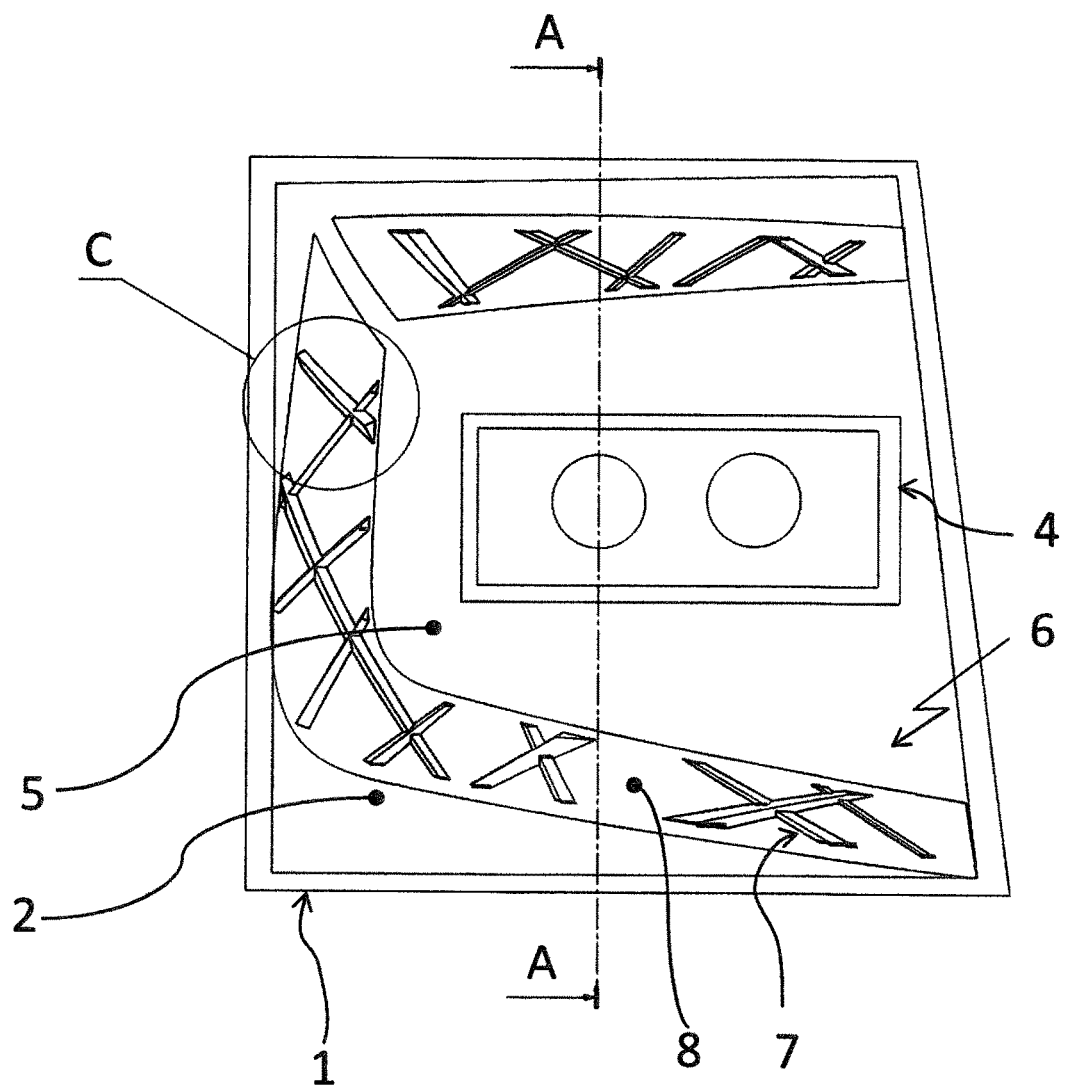

2016/0195234 A1 7/2016 Mateju et al.

FOREIGN PATENT DOCUMENTS

| DE | 69800971 T2 | 4/2002 |
|----|----|----|
| DE | 69721918 T2 | 5/2004 |
| DE | 202005014267 U1 | 11/2005 |
| DE | 102005019018 A1 | 10/2006 |
| DE | 102009058457 A1 | 6/2011 |
| DE | 102011111994 B3 | 7/2012 |
| EP | 1126209 A2 | 8/2001 |
| EP | 1804092 A1 | 7/2007 |
| EP | 1950492 A1 | 7/2008 |
| FR | 2758874 A1 | 7/1998 |
| FR | 2965328 A1 | 3/2012 |
| WO | 2006082081 A1 | 8/2006 |

OTHER PUBLICATIONS

Search Report Completed Sep. 14, 2016 in Corresponding Czech Application PV 2016-176 (3 pages).

LIGHT DEVICE, ESPECIALLY A SIGNAL LAMP FOR MOTOR VEHICLES

FIELD OF THE INVENTION

The invention relates to a light device, especially a signal lamp for motor vehicles whose emitted light beams create various patterns and spatial effects.

BACKGROUND INFORMATION

The primary task of light devices of motor vehicles is to light the carriageway or to emit light signal functions. However, at present there is an increasing focus on significantly higher involvement of headlights and signal lamps in the designer concept of the vehicle. Light devices should not only emit light with the required radiation characteristic, but at the same time they should participate in the character of the vehicle.

A signal lamp, especially one for motor vehicles, contains multiple lighting units wherein each of these lighting units provides a different light function or contributes to ensuring the required emission characteristic of the light trace. Individual lighting units are generally mounted in a shaped carrying bushing of the lamp, wherein each unit contains at least one light source and other optical elements. The light source emits light rays and the optical elements represent a system of refractive and reflective surfaces and interfaces of optical environments that influence the direction of light rays within the creation of the output light trace.

A number of lighting devices are known from the prior art that are adapted to create various patterns and spatial effects. E.g. the document EP1126209 discloses a lighting device comprising a light guiding optical element adapted to combine the light generated by two different light sources, the device making it possible to emit a different light pattern in the lit state. A disadvantage of the above mentioned solution consists in limited designer options because designer requirements for the external appearance of the product cannot be met, e.g. it cannot actively create light patterns with a spatial effect in the lit state and in the off state, when the optical elements do not provide a spatial impression. The device does not support creation of 3D effects after switching off of the light source, e.g. in the form of spatially arranged crystals.

The documents CZ20150002 discloses the design of a signal lamp that comprises a spatially shaped light guide the parts of which, especially the output surfaces, overlap each other in the view of the inner space of the headlight, which makes it possible to produce a spatial effect, e.g. in the form of spatially arranged crystals, even after the light source being switched off. A disadvantage of this design is the fact that the spatially shaped light guide occupies a considerable installation space, is expensive to produce and does not allow more light functions to be combined.

The document FR2758874 discloses a lighting device that makes it possible to create a spatial effect through a combination of two differently colored materials, which supports better effects of the external appearance of the product even in the off state, i.e. when the light source has been switched off. The document FR2965328 discloses a lighting and/or signaling device comprising more optical elements situated in the inner space of the lamp, creating one complex part with an externally situated light guide. Individual optical elements can be made of a translucent or transparent or reflective or diffusive, or opaque or fluorescent or metal-plated material, wherein individual optical elements can be shaped in any way to ensure an optimum optical performance. A disadvantage of this device consists in high requirements for the installation space inside the light device.

An optical concept making it possible to combine more light functions and/or light from more light units is known from the document EP1950492. The document DE102011111994 discloses a light device in the form of a light disk that contains two layers adjacent to each other. The first body/layer is made of a transparent material and is adapted to conduct light, being fitted with light guides to emit light in the required direction. The other body/layer is created as a semi-transparent plate fitted with multiple openings the light guides of the first body lead into. The other body creates a light scattering area between the openings so that the light emitted by the first body can be bound to the other body and can pass through this other body to be subsequently scattered on its diffusion surface. The document WO2006082081 discloses a lighting device containing light sources whose light is emitted towards a diffusion layer containing plastic dispersion elements, the diffusion layer being a part of the outer housing of the lighting device. A disadvantage of the above mentioned solutions is the fact that the optical concepts are not adaptable to designer requirements for the external appearance of the product as the lighting device should participate in the character of the vehicle and produce certain impressions. They do not make it possible to combine more light functions from different lighting means, either.

The objective of the invention is to design a light device, especially a signal lamp for motor vehicles, that can be adapted to designer requirements for the external appearance of the product, wherein the light device should, besides emitting light, participate in the designer character of the vehicle. In the off state, a spatial impression should be maintained and the device must offer the possibility to create light effects, e.g. in the form of spatially arranged crystals. The optical concept must not occupy a large installation space, and the light device must not be expensive to produce, and must make it possible to combine more light functions and/or to use light from more light means.

SUMMARY OF THE INVENTION

The above mentioned objectives of the invention are fulfilled by a light device, especially a signal lamp for motor vehicles in accordance with the invention comprising a carrier bushing covered by a translucent cover and an inner chamber wherein a lighting unit is mounted providing the light signaling function, as well as at least one light source. A filter is also provided, with at least one first input surface for the entry of at least a part of light rays generated by the light source or sources, and with at least one outwardly oriented first output surface designed to emit the first light beam. The filter includes a first segment having the first output surface, which is adapted to emit the first light beam from the first output surface, and a second segment with at least one second input surface for the entry of at least a part of light rays generated by at least one of the light sources, and with at least one second output surface. The first segment and the second segment are created of different materials, and the second output surfaces have a shape to create a designer element in the form of a light emitting pattern emitted from the second output surfaces.

In one of the embodiments, the first segment of the filter is designed as a diffusion means adapted with its internal and/or external structure to emit the first homogenized light beam.

In another one of the embodiments, the second segment is configured to emit the second light beam from the second output surface in a predefined direction with predefined diffusion.

The first segment of the filter can be made of a transparent/clear material.

The filter can be produced as a compact casting.

In one of the embodiments, at least some of the second output surfaces continue the peripheral edges of the first output surfaces with at least some of their peripheral edges so that the first output surfaces and the second output surfaces form one or more continuous output surfaces together.

In one of the embodiments, the second output surfaces are situated closer to the external transparent cover than the adjacent first output surfaces.

The second light beam emitted from the second output surface can have a higher intensity than the first output beam emitted from the first output surface.

In one of the embodiments, the first segment and the second segment of the filter are mutually arranged and adapted in such a way that the light beams do not pass from the second segment to the first segment and/or from the first segment to the second segment.

In one of the embodiments, the first segment contains openings that the emitting members of the second segment, which comprise the second output surfaces, lead into.

In one of the embodiments, in the propagation direction of the light rays generated by at least one of the light sources before the filter, an optical element is arranged to route the light rays to the required direction. The optical element may be an optical structure and/or reflective surface and/or collimating member.

The second segment can be designed as a light guide.

In one of the embodiments, the light device comprises at least two light sources, and the second segment is fitted with at least two input surfaces to bind light to the second segment from the said two light sources.

In one of the embodiments, the light device comprises at least two light sources, the second segment being fitted with a stepwise shaped surface comprising, in a mutually alternating way, the second input surfaces designed to bind the light generated by one of the light sources, and reflective surfaces designed to direct the light that has been bound to the second segment from the second of the light sources.

In one of the embodiments, the second segment is fitted with a stepwise shaped surface comprising, in a mutually alternating way, the second input surfaces for binding light from one light source or one group of the light sources on the one hand, and at least one second input surface for binding light from the second light source or from the second group of light sources.

The light sources can be arranged in the internal space in the same carrier.

In one of the embodiments, the second segment of the filter emits the second light beam of a different color than the first light beam emitted through the first segment of the filter.

In another one of the embodiments, the second segment is adapted to bind light rays of various colors to emit the second light beam of various colors, wherein multicolored second light beams are emitted from the same second output surface.

OVERVIEW OF FIGURES IN THE DRAWINGS

Figure 2:
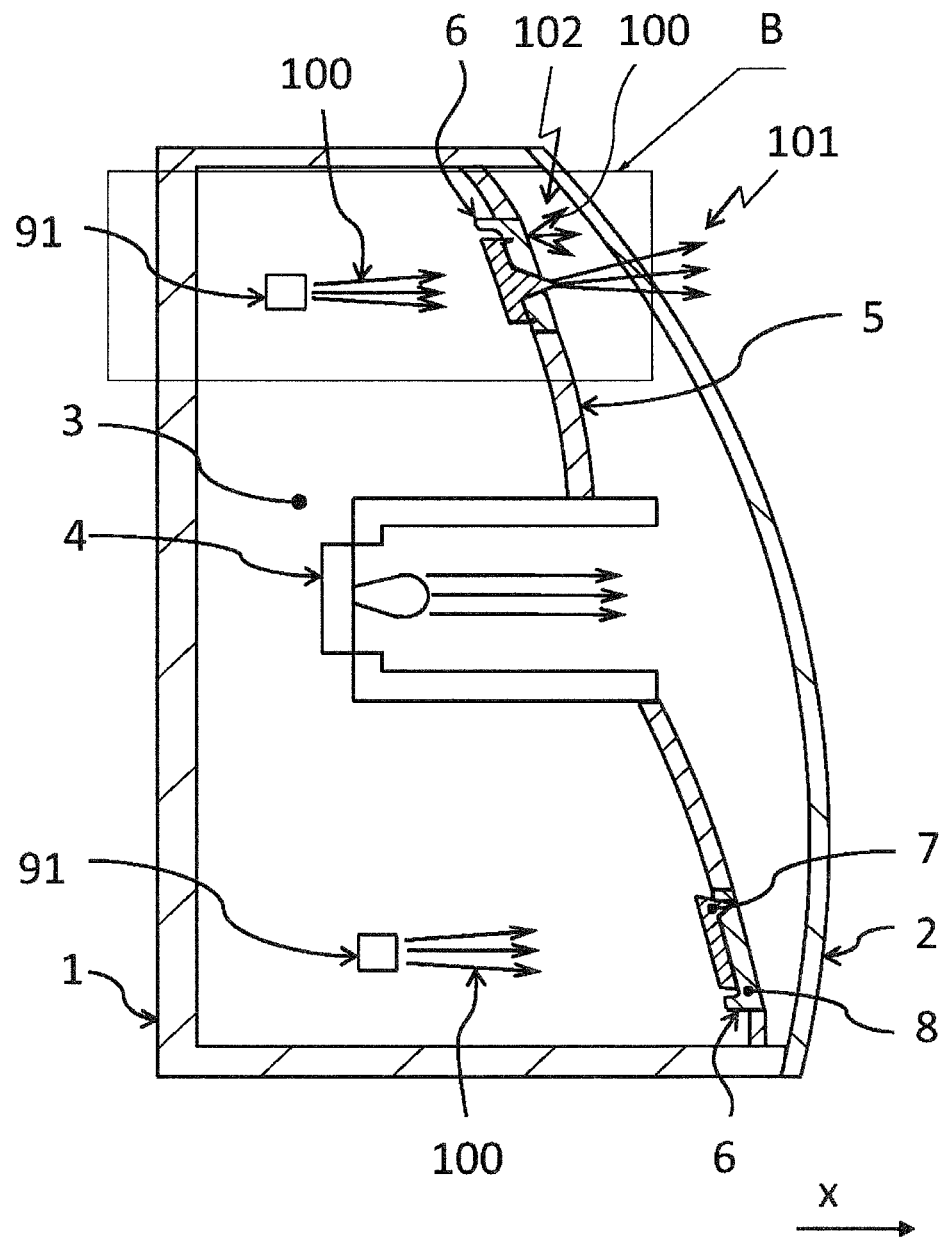
Figure 3:
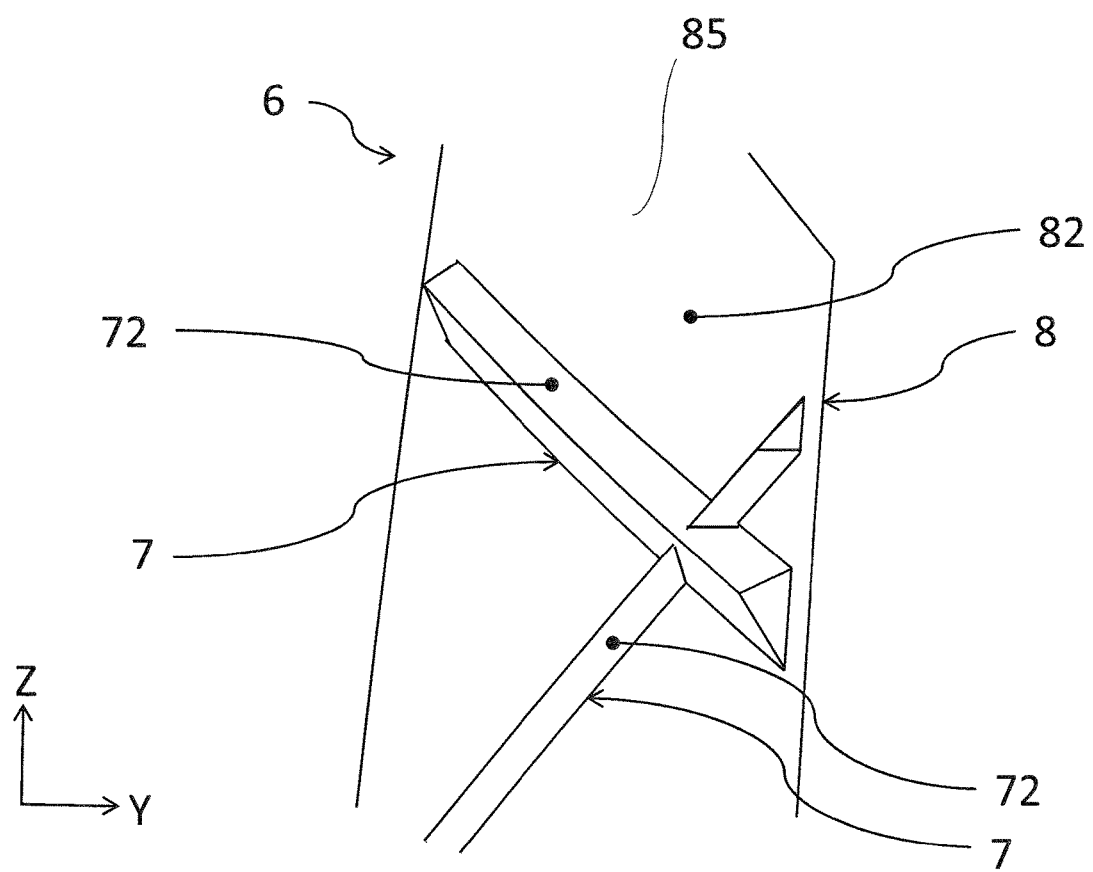
Figure 4:
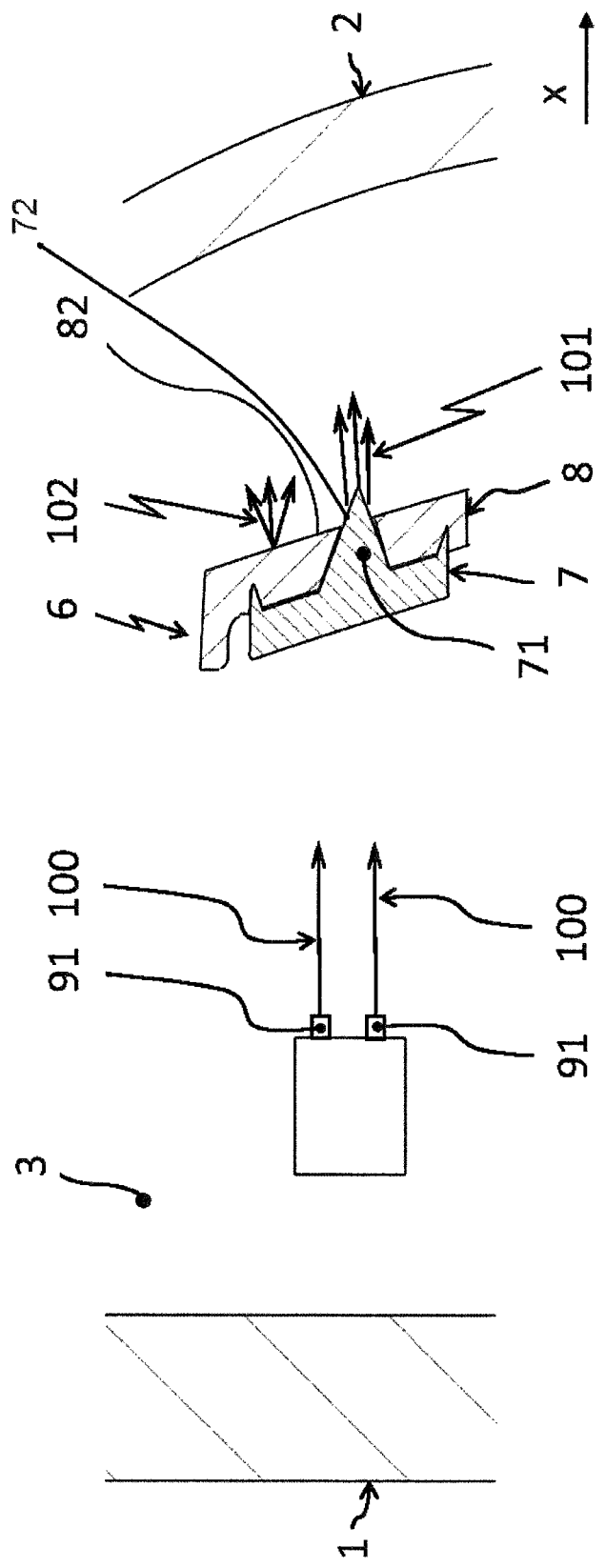
Figure 5:
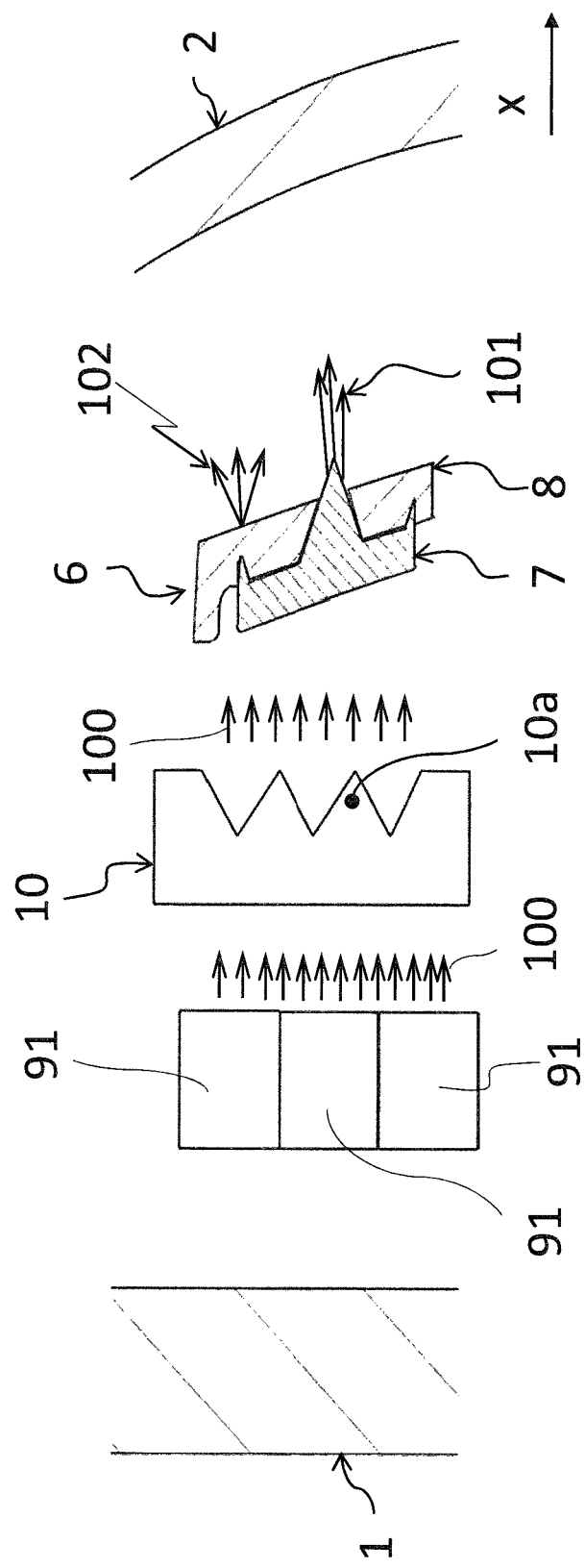
Figure 6:
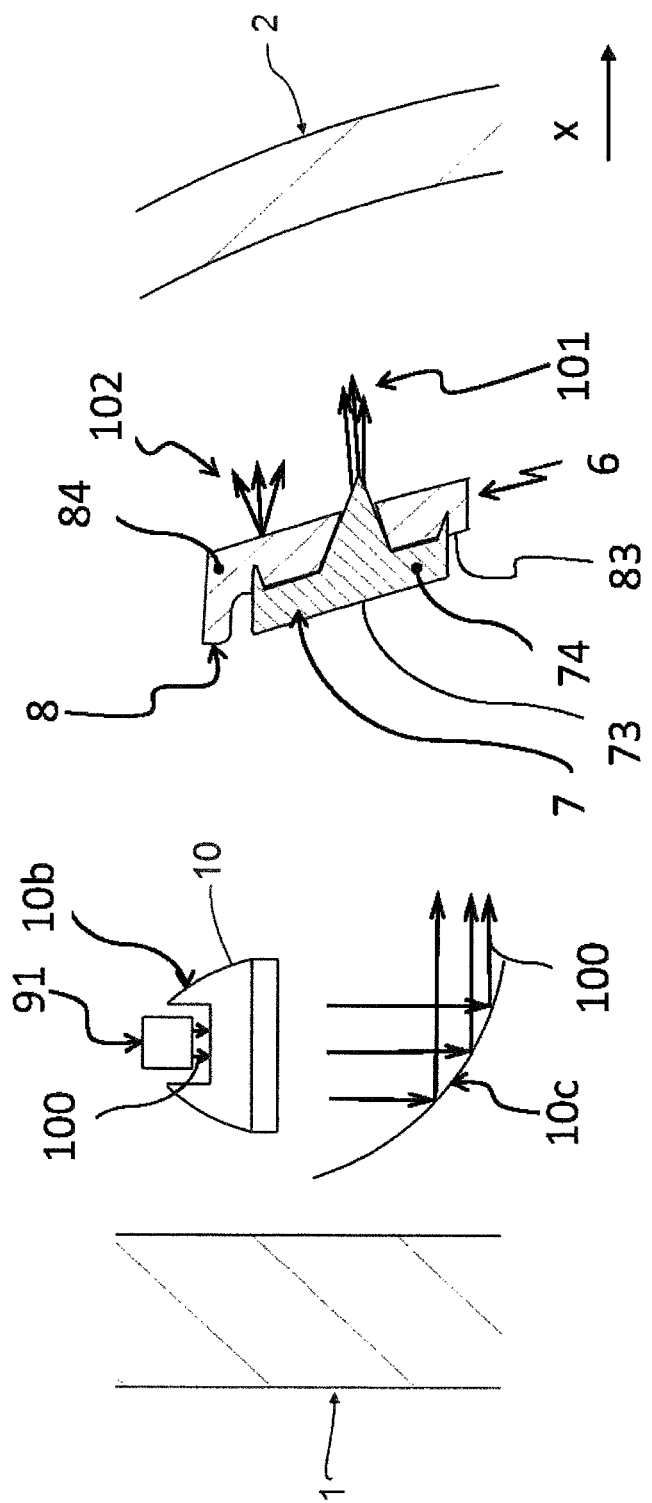
Figure 7:
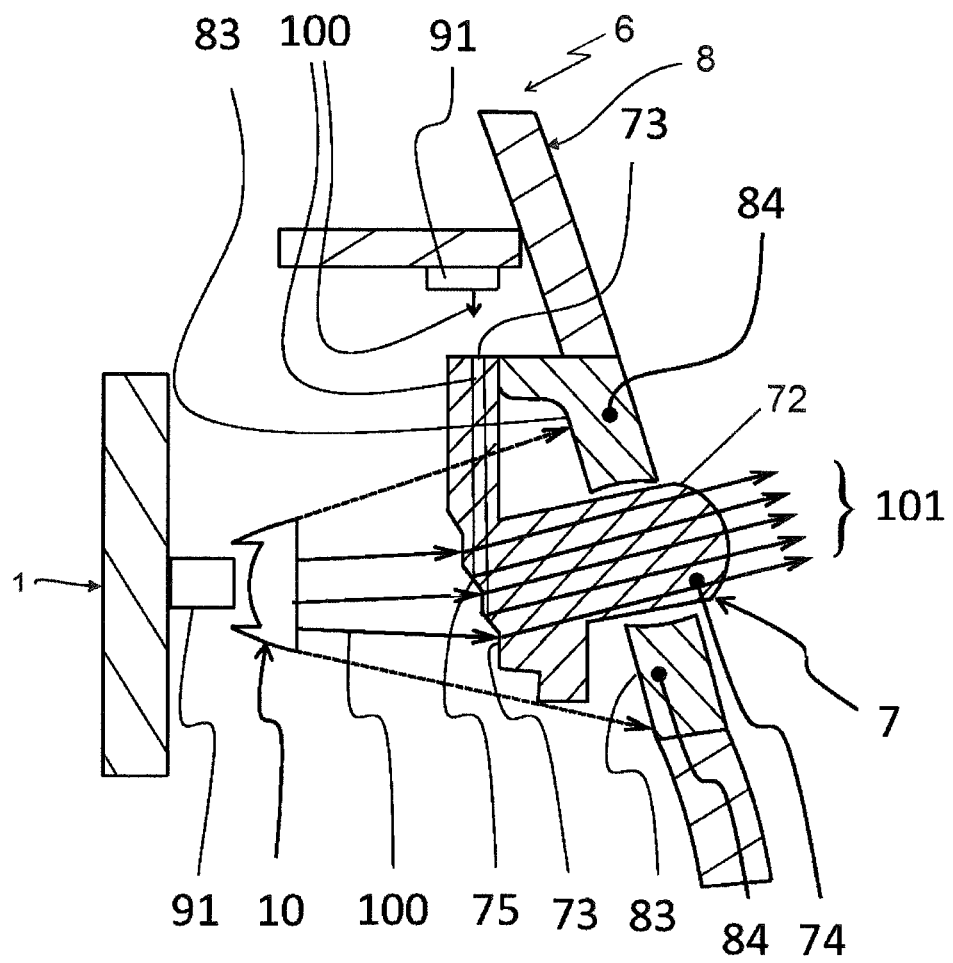
Figure 8:
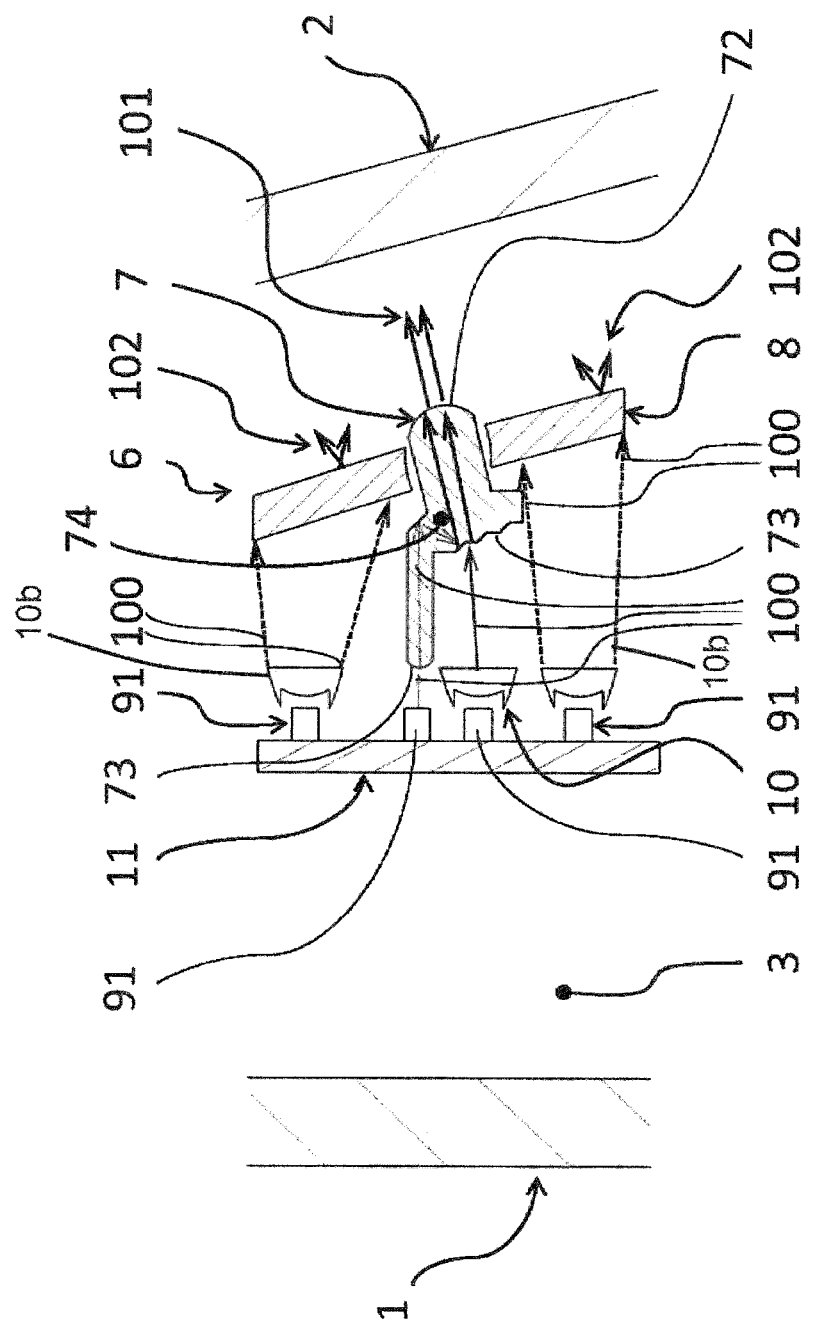
Figure 9:
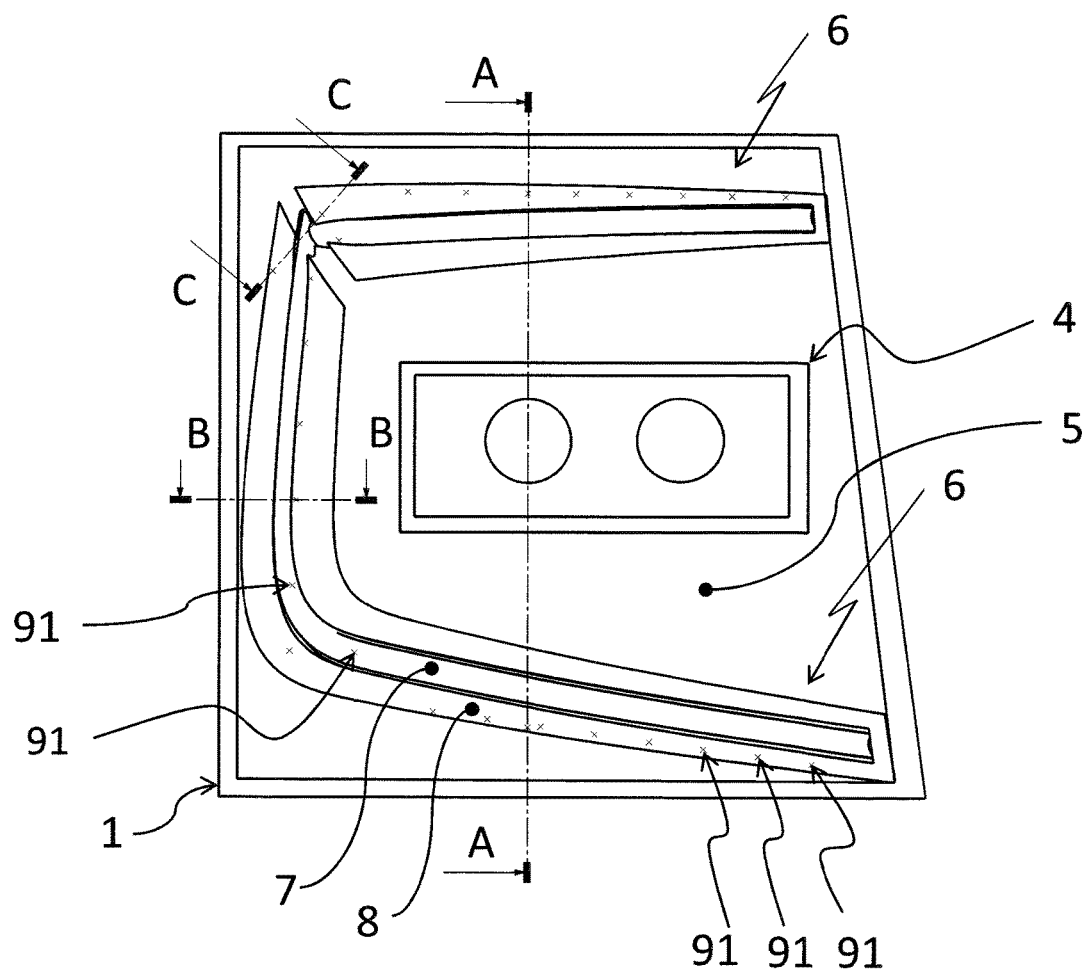
Figure 10:
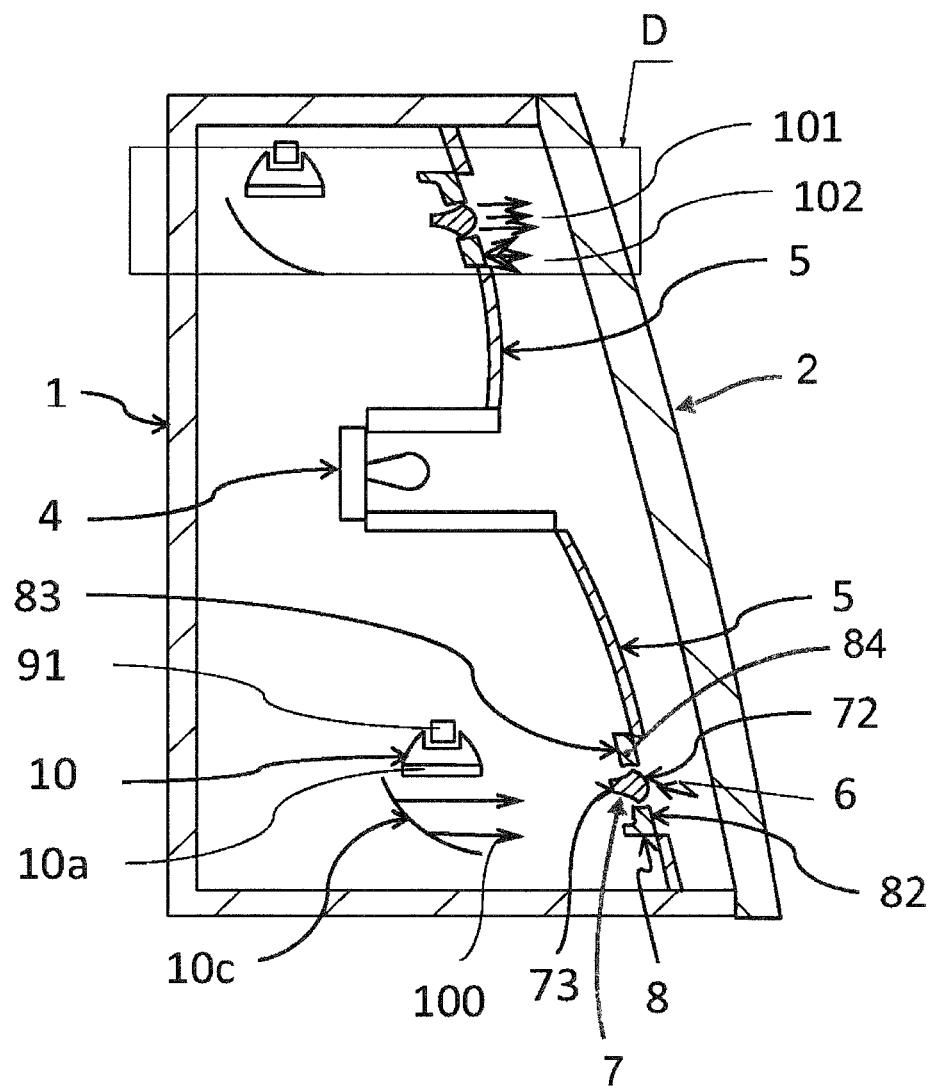
Figure 11:
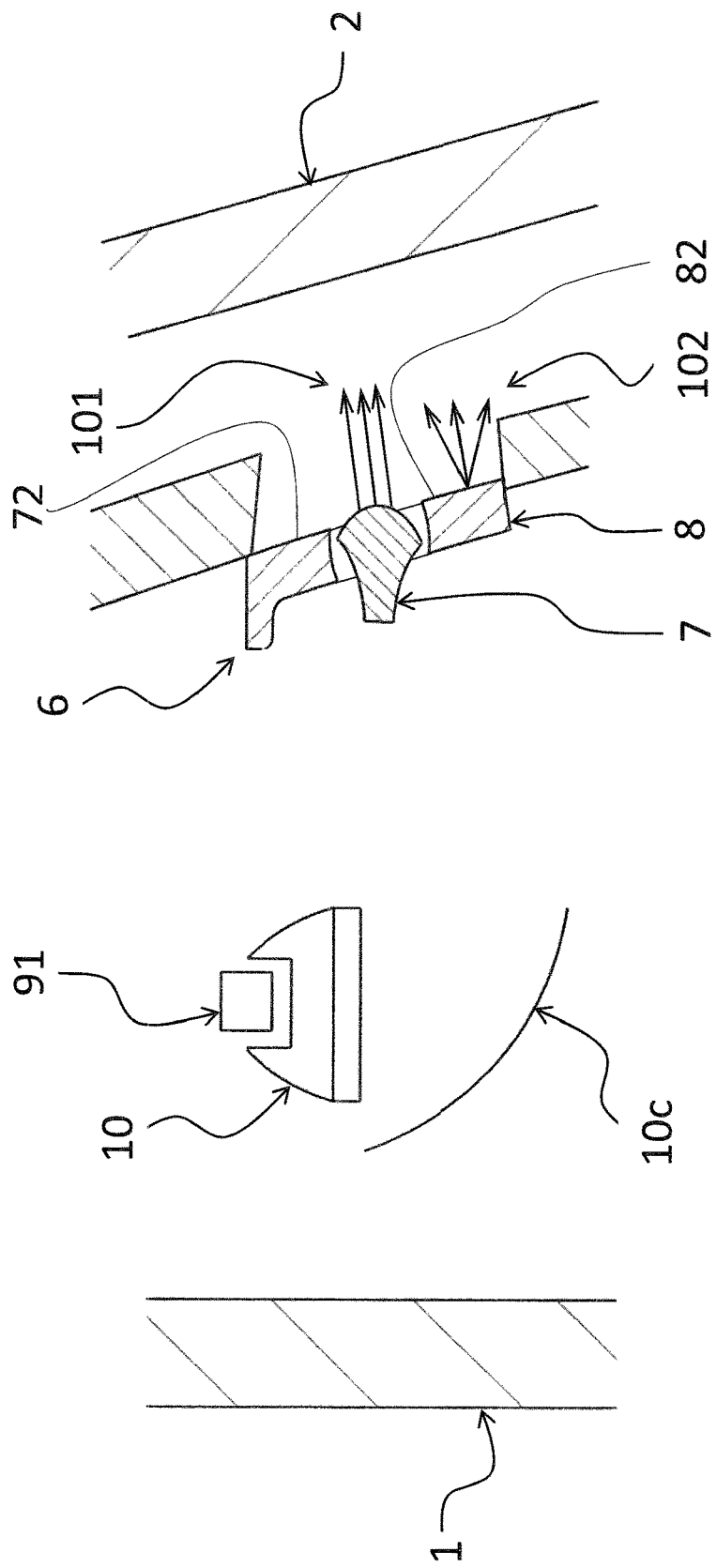
Figure 12:
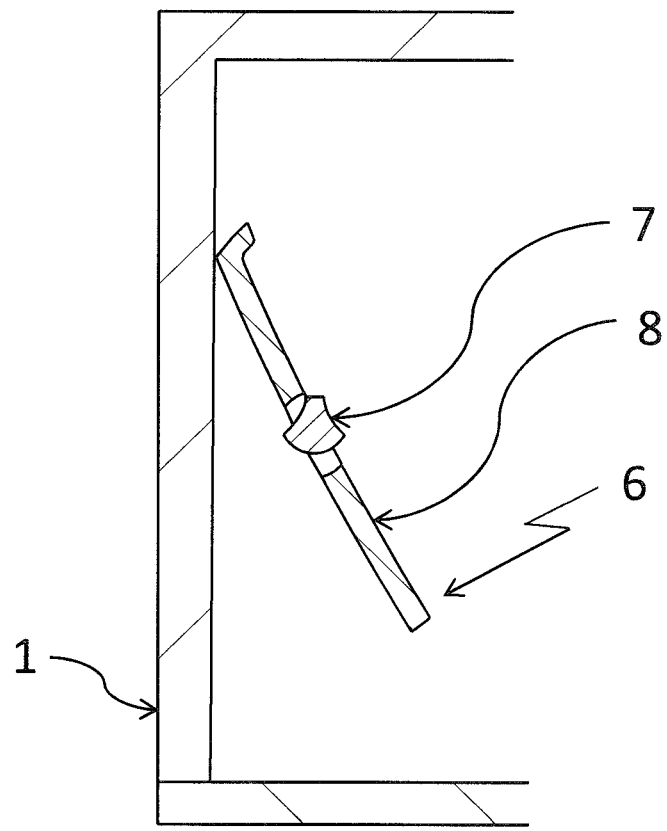
Figure 13:
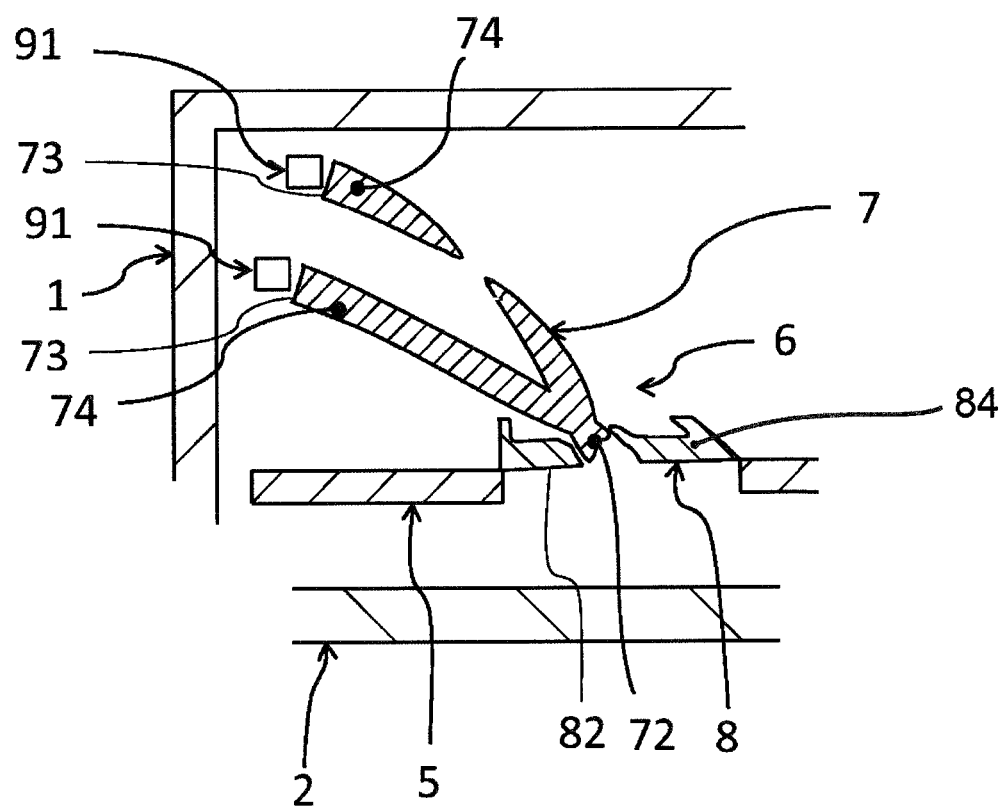

The invention will be clarified in a more detailed way with the use of its embodiment examples with references to attached drawings, where:

FIG. 1 shows the front view of a first example of an embodiment of the light device in accordance with the present invention, FIG. 2 shows a longitudinal section A-A taken through the light device from FIG. 1, FIG. 3 shows an enlarged image of detail C from FIG. 1, FIG. 4 shows an enlarged image of detail B from FIG. 2, FIG. 5 shows a partial longitudinal section through a second example of an embodiment of the light device according to the present invention, FIG. 6 shows a partial longitudinal section through a third example of an embodiment of the light device according to the present invention, FIG. 7 shows a partial longitudinal section through a fourth example of an embodiment of the light device according to the present invention, FIG. 8 shows a partial longitudinal section through a fifth example of an embodiment of the light device according to the present invention, FIG. 9 shows the front view of a sixth embodiment of the light device in accordance with the present invention, FIG. 10 shows a longitudinal section A-A taken through the light device from FIG. 9, FIG. 11 shows an enlarged image of detail D from FIG. 10, FIG. 12 shows a longitudinal section B-B taken through the light device from FIG. 9, and FIG. 13 shows a longitudinal section C-C taken through the light device from FIG. 9.

EXAMPLES OF EMBODIMENTS

With reference to FIGS. 1-3, a first example of an embodiment of the light device according to the invention comprises a shaped carrier bushing 1 forming the inner chamber 3 of the light device, which is covered with a translucent cover 2. In the inner chamber 3 of the lamp, a lighting unit 4 is mounted to ensure the required light trace emission characteristics. The light device comprises a covering mask 5 to cover some components when the inner space of the light device is viewed. The optical assembly 4 comprises a filter 6.

The filter 6 comprises the first segment 8 and the second segment 7. The first segment 8 is configured in such a way to emit the first diffused light beam 102, which is homogenized, wherein the second segment 7 and its second output surface 72, emitting the second light beam 101, are configured in such a way to route the second light beam 101 in a predefined direction with predefined diffusion from this direction.

The direction of the second light beam 101 generally, for the purposes of this invention application (i.e. for all the embodiments of the invention) refers to the axis of symmetry of the second light beam 101, the said diffusion referring to a half of the angle the outermost light ray of the second light beam 101 makes with this direction. In a special embodiment, the direction of the second light beam 101 can lie on the optical axis x, which is essentially parallel to the driving direction of the vehicle.

FIG. 3 shows detail C from FIG. 1, and FIG. 4 shows detail B from FIG. 2. These figures show the filter 6, which is realized as a compact casting of two segments—the first segment 8 and the second segment 7. The first segment 8 and the second segment 7 are made of different materials, and are respectively fitted with spatially separated first and second output surfaces 82, 72, wherein the second output surfaces 72 of the second segment 7 do not lie on the same plane as the first output surfaces 82 of the first segment 8. The second output surfaces 72 are situated on the light emitting members of the second segment 7 in such a way as to create a certain designer element having the form of a light emitting pattern. The second output surfaces 72 are brought through the first segment 8 of the filter 6 in such a way as to be situated closer to the outer transparent cover 2 than the first output surfaces 82 of the first segment 8. The second segment 7 of the filter 6 is adapted to bind the light beam or light ray 100 generated by the light source 91 situated in the inner chamber 3 of the lamp. The second segment 7 is made of a transparent/clear material and is adapted to guide and direct light, being fitted with light emitting members 71 e.g. in the form of spatially arranged crystals whose second output surfaces 72 are brought through the first segment 8 of the filter 6 towards the outer cover 2, and are adapted to emit the second directed light beam 101. The first segment 8 is designed as a diffusion means adapted with its inner and/or outer structure to emit a homogenized light beam 102, being equipped with openings 81 the emitting members 71 lead into on the one hand, and with the first output surface 82 on the other hand. The first light beam 102 and the second light beam 101, respectively emitted by the first output surface 82 and the second output surface 72 of the first segment 8 and the second segment 7, differ both with their shape and the intensity and homogeneity of the light trace. The second output surfaces 72 of the second segment 7 of the filter 6 are adapted to emit the second light beam 101 especially in the direction of the optical axis x with slight diffusion from the optical axis X, wherein the first output surfaces 82 of the first segment 8 are adapted to diffuse and homogenize the first light beam 102, directing rays to different directions. The first output surfaces 82 and the second output surfaces 72 form a continuous output surface 85 together.

FIG. 5 shows a second embodiment of the light device in accordance with the invention, containing three light sources 91, e.g. LEDs, generating light rays 100. To improve homogeneity of the first and second output light beam 102, 101, an optical element 10 is arranged in the propagation direction of the light rays 100 generated by the light sources 91, containing an inner or superficial optical structure 10a to concentrate the light rays 100 to the required direction, e.g. direction of the optical axis x.

FIG. 6 shows a third embodiment of the light device in accordance with the invention, where more optical elements 10 are situated in the propagation direction of the light rays 100 to direct light to the bodies 84, 74 of the first and second segment 8 and 7, respectively. At the light source 91, a collimating member 10b is situated, enabling binding of light rays 100 and their concentration to the required direction. After the collimating member 10b, there is a reflective surface 10c, preferably of the diffusion type, to route the collimated light beams to the required direction, preferably to the direction of the optical axis x of the light device. After the reflective surface 10c, in the propagation direction of the reflected light rays, a filter 6 is arranged through which the first and second light beam 102, 101 exit towards the cover 2.

FIG. 7 shows a fourth embodiment of the light device in accordance with the invention comprising multiple light sources 91 to achieve the output characteristics of two different signaling functions through different output surfaces—the first output surface 82 and the second output surface 72 of the filter 6. The individual functions are provided by means of two different light beams—the first light beam 102 (not shown in this Fig.) and the second light beam 101 emitted through the first output surfaces 82 and the second output surfaces 72, respectively. The second segment 7 is designed as a light guide of a planar shape that is equipped with at least several second input surfaces 73 to bind light into the body 74 from two different light sources 91, the first segment 8 being fitted with two first input surfaces 83 to bind light into the body 84 from one light sources 91. From one light source 91, a part of the light rays 100 is routed directly to the second segment 7 of the filter 6, and a part of the light rays 100 is routed outside the second segment 7 and directly to the first segment 8 of the filter 6. The second segment 7 is, in its central part, equipped with a broken, stepwise shaped surface where the second input surfaces 73, which are designed to bind the light generated by the second light source 91, and reflective surfaces 75, which are designed to route the light beams 100 bound to the body 74 of the second segment 7 from the first light source 91, are alternately arranged. This arrangement makes it possible to efficiently combine different light functions from different light sources as the rear outline light and brake light or red color, wherein a different intensity of the output light beam is required for each light function. The first output surfaces 82 and the second output surfaces 72 form a continuous output surface 85 together.

FIG. 8 shows a fifth embodiment of the light device in accordance with the invention, wherein four light sources 91 are situated on the same carrier 11 in the inner space 3 of the lamp, e.g. on the same printed circuit board or cooler. From the first light source 91, the light rays 100 are routed indirectly via the collimating member 10b to the first segment 8 of the filter 6. From the second light source 91, the light rays 100 are routed directly to the second segment 7 of the filter 6, wherein in the body 74 of the second segment, the light rays 100 are further guided and routed to the second output surface 72. From the third light source 91, the light rays 100 are routed indirectly to the second segment 7 of the filter 6 through the collimating member 10b. From the fourth light source 91, the light rays 100 are routed indirectly via the collimating member 10b to the first segment 8 of the filter 6. The light rays 100 from the second and third light source 91, are bound to the body 74 through an array of input surfaces 73, wherein some light rays 100 are reflected or directed in the body 74 by total reflection, all the light rays 100 being guided towards the second output surface 72 in such a way as to create a light beam 101. The light rays 100 from the first and fourth light source 91 create the first light beam 102. In one embodiment, the second segment 7 of the filter 6 is adapted to emit the second light beam 101 of two different colors, e.g. red and orange, the second and third light source 91 emitting light rays 100 of a different color. Switching the respective light sources 91 on/off enables emitting of light beams 101 of different colors from the same second output surface 72. In another embodiment, the second segment 7 of the filter 6 emits the second light beam 101 of a different color than the first light beam 102 emitted through the first segment 8 of the filter 6.

FIGS. 9 to 13 show a sixth embodiment of the light device containing multiple light sources 91 to emit two different output light beams—the first output beam 102 and the second output beam 102 through the first output surfaces 82 and the second output surfaces 72, respectively, of the filter 6. The second segment 7 is designed as a linear light guide with a circular or mushroom-like profile that is equipped with at least one second input surface 73 for direct binding of light into the body 74 from the primary light source 91. The first segment 8 is equipped with the first input surfaces 83 for indirect binding of light into the body 84 from the secondary light source 91. The first and second segment 8 and 7 are mutually arranged and adapted in such a way that either of the segments 7, 8 can bind light rays from a separate light source 91.

Different routing of light rays by the second segment 7 and the first segment 8 causes creation of a light boundary between two output surfaces in the filter 6—the first output surface 82 and the second output surface 72, wherein in the off state the spatial impression is maintained. A part of the filter 6 is made of a milk-colored material and a part of a transparent material, namely as an integral body made with the use of the multiple injection method. The spatial impression is highlighted by the spatial arrangement of individual, outwardly oriented, spatially separated first and second output surfaces 82 and 72. The light emitted through the second segment 7 has a higher intensity than the light emitted through the first segment 8, which supports creation of light effects and shapes of light patterns that are interesting from the designer point of view. The fact that the second output surfaces 72 of the second segment 7 are spatially offset from the first output surfaces 82 of the first segment 8 in the filter 6 and, at the same time, the individual segments 7 and 8 are made of a different material, makes it possible to actively create light patterns in the on state, while in the off state the spatial effect is maintained.

In an alternative embodiment, the segments 7 and 8 are mutually arranged and adapted in such a way that the first segment 8 should not bind any light rays from the first segment and/or the first segment 8 should emit the first light beam 102 at a very low intensity. In one embodiment, the light emitted by the filter 6 does not have to be designed to provide any light function with a required emission characteristic of the light trace. Thus, the quantity, shape, size and spatial arrangement of the segments 7, 8 can be changed in any way to meet designer requirements for the external appearance of the product, without influencing the emission characteristic of the light function. Also, two light functions of a different color can be combined, e.g. direction indication of the orange color generated by one light source 91 through the second segment 7, and an outline light or brake light of the red color generated by the second light source 91 through the first segment 8. From one light source 91, light rays may be routed to the filter 6 to provide a designer function by emitting light from the output surface 72, 82, and at the same time outside the filter 6 to provide another signaling function, or the light sources 91 can be grouped in such a way that one group of the light sources 91 is responsible for creation of the first light beam 102, and the second group of the light sources is responsible for the creation of the second light beam 101. If a higher intensity of the second light beam 101 is required, light rays emitted by more light sources 91 can be bound through multiple second input surfaces 73.

LIST OF REFERENCE MARKS

1—carrier bushing
2—translucent cover
3—inner chamber
4—lighting unit
5—covering mask
6—filter.
7—second segment
71—emitting member
72—second output surface
73—second input surface
74—body
75—reflective surfaces
8—first segment
81—opening
82—first output surface
83—first input surface
84—body
85—continuous output surface
91—light source
10—optical element
10a—optical structure
10b—collimating member
10c—reflective surface
11—light source carrier
100—light ray
101—second light beam
102—first light beam
X, Y, Z—coordinate axes of the Cartesian coordinate system

The invention claimed is:

1. A signal lamp for a motor vehicle, said signal lamp comprising a housing defining an inner chamber covered by a transparent cover to separate the inner chamber from an outside environment of the motor vehicle, the chamber of the signal lamp comprising:
   (a) a first lighting unit associated with one or more first light sources, wherein the first lighting unit is configured to provide a light signaling function; and
   (b) at least one second lighting unit separate from the first lighting unit comprising one or more second light sources and a filter, wherein the filter contains—
      a first segment comprising at least one first input surface for the entry of at least a part of light rays generated by the one or more second light sources and at least one outwardly oriented first output surface having peripheral edges and configured to emit a first light beam, and
      a second segment comprising at least one second input surface for the entry of at least a part of light rays generated by the one or more of the second light sources and one or more second output surfaces having peripheral edges and a perimeter,
   wherein the first segment and the second segment are created with different materials,
   wherein the second segment is inserted with the second output surface into the first segment in such a way that in a front view, the second output surface and the first output surface are arranged with a gap or without a gap next to each other and the second output surface is surrounded by the first output surface along at least a part of the perimeter of the second output surface,
   wherein the second output surface of the second segment does not lie on the same plane as the first output surface of the first segment, and
   wherein the at least one of first input surface of the first segment is arranged so that light rays enter the at least one of first input surface without having passed through the second segment.

2. The signal lamp according to claim 1, wherein at least part of the peripheral edges of at least one the second output surfaces continues the peripheral edges of an adjacent first output surface so that at least part of the second output surfaces and the adjacent first output surface form a continuous output surface together.

3. The signal lamp according to claim 1, wherein the filter is created as a compact casting.

4. The signal lamp according to claim 1, wherein the first segment of the filter is designed as a diffusion means adapted with its internal and/or external structure to emit the first light beam.

5. The signal lamp according to claim 1, wherein the second segment is configured to emit a second light beam from the second output surface in a predefined direction with predefined diffusion.

6. The signal lamp according to claim 1, wherein the first segment of the filter is made of a transparent/clear material.

7. The signal lamp according to claim 1, wherein a second light beam emitted from the second output surface has a higher intensity than a first light beam emitted from the first output surface.

8. The signal lamp according to claim 1, wherein the first segment and the second segment of the filter are mutually arranged and adapted in such a way to prevent passing of the light rays from the second segment into the first segment and/or from the first segment to the second segment.

9. The signal lamp according to claim 1, wherein in the propagation direction of the light rays generated by at least one of the second light sources, an optical element for routing the light rays to the required direction is arranged before the filter.

10. The signal lamp according to claim 9, wherein the optical element is an optical structure and/or reflective surface and/or collimating member.

11. The signal lamp according to claim 1, wherein the second segment is designed as a light guide.

12. The signal lamp according to claim 1, wherein the signal lamp comprises at least two second light sources and the second segment is fitted with at least two second input surfaces for binding the light into the second segment from the said two second light sources.

13. The signal lamp according to claim 1, wherein the signal lamp comprises at least two second light sources, the second segment being fitted with a stepwise shaped surface comprising, in a mutually alternating way, second input surfaces designed to bind the light generated by one second light source, and reflective surfaces designed to direct the light that has been bound to the second segment from another second light source.

14. The signal lamp according to claim 1, wherein the second segment is fitted with a stepwise shaped surface comprising, in a mutually alternating way, second input surfaces for binding light from one second light source or one group of the second light sources on the one hand, and at least one second input surface for binding light from another second light source or from another group of second light sources.

15. The signal lamp according to claim 1, wherein the second light sources are situated in the inner space on a same carrier.

16. The signal lamp according to claim 1, wherein the second segment of the filter is configured to emit a second light beam of a different color than a first light beam emitted by the first segment of the filter.

17. The signal lamp according to claim 1, wherein the second segment of the filter is adapted to bind light rays of different colors to emit second light beams of different colors, wherein the second light beams having different colors that are emitted from the same second output surface.

18. The signal lamp according to claim 1, wherein the second output surface protrudes over the first output surface in the direction towards the transparent cover.

* * * * *